(12) United States Patent
Park et al.

(10) Patent No.: US 7,962,180 B2
(45) Date of Patent: Jun. 14, 2011

(54) MOBILE COMMUNICATION TERMINAL AND METHOD FOR PROCESSING EVENT THAT USER MISSED

(75) Inventors: Chan Woo Park, Seoul (KR); Do Hwan Choi, Seongnam-si (KR); Jong Hyun An, Seoul (KR); Yun Geun Jang, Goyang-si (KR); Myeong Lo Lee, Seoul (KR); Ha Ran Jung, Yongin-si (KR); Jong Pil Shin, Seoul (KR)

(73) Assignee: Samsung Electronics Co., Ltd (KR)

( * ) Notice: Subject to any disclaimer, the term of this patent is extended or adjusted under 35 U.S.C. 154(b) by 867 days.

(21) Appl. No.: 11/945,788

(22) Filed: Nov. 27, 2007

(65) Prior Publication Data

US 2008/0125178 A1 May 29, 2008

(30) Foreign Application Priority Data

Nov. 27, 2006 (KR) .......................... 10-2006-0117750

(51) Int. Cl.
*H04M 1/00* (2006.01)
*G09G 5/00* (2006.01)

(52) U.S. Cl. ....................................... 455/566; 345/168
(58) Field of Classification Search .................. 455/564, 455/566; 345/168, 169, 173
See application file for complete search history.

(56) References Cited

U.S. PATENT DOCUMENTS

| | | | | |
|---|---|---|---|---|
| 5,572,573 A * | 11/1996 | Sylvan et al. | ............... | 455/556.2 |
| 5,581,243 A * | 12/1996 | Ouellette et al. | ............... | 345/173 |
| 5,615,384 A * | 3/1997 | Allard et al. | .................. | 715/800 |
| 5,710,810 A | 1/1998 | Tiilikainen | | |
| 6,426,736 B1 | 7/2002 | Ishihara | | |
| 7,009,599 B2 * | 3/2006 | Pihlaja | .......................... | 345/173 |
| 7,479,947 B2 * | 1/2009 | Pihlaja | .......................... | 345/173 |
| 7,602,378 B2 * | 10/2009 | Kocienda et al. | ............. | 345/169 |
| 2002/0027549 A1 * | 3/2002 | Hirshberg | ..................... | 345/168 |

FOREIGN PATENT DOCUMENTS

| | | |
|---|---|---|
| JP | 2006-067532 | 3/2006 |
| KR | 1020020085309 | 11/2002 |
| KR | 1020050042852 | 5/2005 |
| KR | 1020050119597 | 12/2005 |

* cited by examiner

*Primary Examiner* — Blane J Jackson
(74) *Attorney, Agent, or Firm* — The Farrell Law Firm, P.C.

(57) ABSTRACT

A mobile communication terminal and method for processing missed events are disclosed. A user can check missed events on a wait screen at a glance and rapidly respond to the missed events. A controller stores the missed events received in a wait state. When the wait state is changed to an enabled state, an event displaying unit displays event icons associated with the missed events on key cells of a touch keypad. When an event icon is touched, a function executing unit executes a function associated with the touched event icon. A display changes from the wait screen to the function executing screen. Since the missed events are displayed as event icons on the touch keypad, a user can read a state of the missed events at a glance. As well, the user can read contents of the missed events that are associated with the event icon touched on the function executing screen, and rapidly respond to the missed events.

20 Claims, 9 Drawing Sheets

MOBILE COMMUNICATION TERMINAL AND METHOD FOR PROCESSING EVENT THAT USER MISSED

CLAIMS OF PRIORITY

This application claims priority to an application entitled "MOBILE COMMUNICATION TERMINAL AND METHOD FOR PROCESSING EVENT THAT USER MISSED" filed in the Korean Intellectual Property Office on Nov. 27, 2006 and assigned Serial No. 2000-0117750, the contents of which are incorporated herein by reference.

BACKGROUND OF THE INVENTION

1. Field of the Invention

The present invention relates to a mobile communication terminal and a method for processing events thereof. More particularly, this invention relates to a mobile communication terminal and method that can rapidly process an event that a user missed.

2. Description of the Related Art

A mobile communication terminal user often happens not to respond to the mobile communication terminal just at the right moment because the user is occupied or has left the terminal behind. In such a case, the mobile communication terminal receives and stores events that the user missed. When the user activates the display of the mobile communication terminal, the events are displayed in a list on a wait screen. The list includes the information on the number of received times according to event types. Here, the missed events may be calls, voice messages, and text messages.

The user can check the missed events on the list displayed on the wait screen. To respond to the missed events, the user must execute corresponding function modes for the respective events, one by one. Here, to "respond" refers to checking details of missed events, to delete, to answer, or to block the missed events. For example, when there is a text message received by a mobile communication terminal, which a user missed, the user executes a text message receiving/sending mode from the wait screen displaying the list and then checks the received text message that was missed.

But, since the list only includes the number of missed events on the wait screen of the mobile communication terminal, the user cannot immediately read information on the callers of the missed events, such as phone numbers, names, etc., in the wait screen.

In addition, the conventional missed event processing method requires excessive key inputting to enter a corresponding function mode to process a missed event, and thus is inconvenient.

SUMMARY OF THE INVENTION

In order to solve the above problems, the present invention makes it easy for a user to check information of callers who cause events in the user's mobile communication terminal, which the user missed.

The present invention allows a mobile communication terminal to rapidly process events that a user missed.

In accordance with an aspect of the present invention, there is provided a method for processing missed events of a mobile communication terminal that includes a display and a touch keypad classified as a plurality of key cells. The method includes storing events received in a wait state of the mobile communication terminal while a user of the mobile communication terminal is away, in which the received events are missed by the user; displaying event icons associated with the received missed events on the key cells of the touch keypad, respectively, when the wait state is changed to an enabled state; and when one of the event icons is touched, executing a function associated with the touched event icon.

Preferably, the missed events include a call, a text message, and a voice message.

Preferably, displaying event icons on the key cells includes displaying the missed events together with the number of the missed events according to the kinds of missed events, on a wait screen of the display.

Preferably, displaying event icons on the key cells includes displaying the missed events in sequence according to time or kinds of received events, on the key cells.

Preferably, the event icon includes identifying icons that classify kinds of missed events.

Preferably, the event icon further includes caller information.

Preferably, the caller information includes at least one or more of caller's icon, avatar, image, name, and phone number.

Preferably, displaying event icons on the key cells includes displaying an identifying icon of the event icon and caller information.

Preferably, executing a function changes the wait screen to a function executing screen associated with the event icon when the event icon is touched.

Preferably, executing a function displays contents of the missed event associated with the touched event icon on the function executing screen.

Preferably, executing a function includes answering, sending, deleting, blocking, and save phone numbers, with respect to the event content.

Preferably, executing a function deletes the event icons displayed on the key cells and displays alphanumeric symbols on the key cells.

In accordance with another aspect of the present invention, a mobile communication terminal is provided that includes a display for displaying a wait screen and a function executing screen; a touch keypad having a plurality of key cells; a storage unit for storing event icons associated with events intended to be received; an event processing unit for storing events in the storage unit, wherein the events are received in a wait state of the mobile communication terminal while a user of the mobile communication terminal is away, in which the received events are missed by the user; an icon extracting unit for extracting event icons associated with the missed events from the storage unit, when the wait state is changed to an enabled state; an event displaying unit for displaying the extracted event icons on the key cells of the touch keypad, respectively; and a function executing unit for executing a function associated with a touched event icon to display it on the function executing screen of the display.

BRIEF DESCRIPTION OF THE DRAWINGS

The above and other features and advantages of the present invention will be more apparent from the following detailed description in conjunction with the accompanying drawings, in which.

DETAILED DESCRIPTION OF PREFERRED EMBODIMENTS

Hereinafter, embodiments of the present invention are described in detail with reference to the accompanying drawings.

Mobile Communication Terminal

Figure 1:
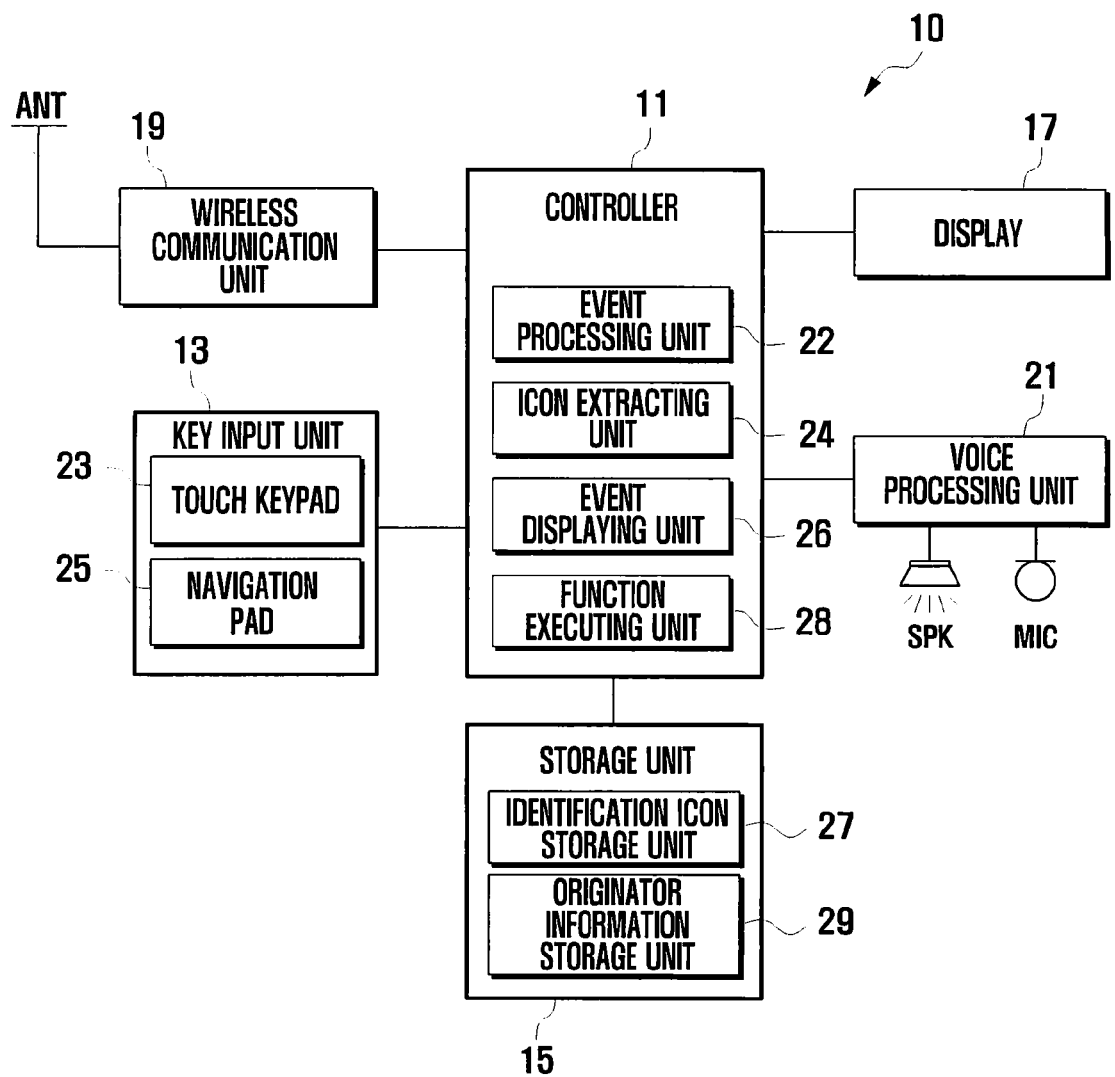
FIG. 1 is a schematic block diagram illustrating a configuration of a mobile communication terminal according to an embodiment of the present invention.
Figure 2:
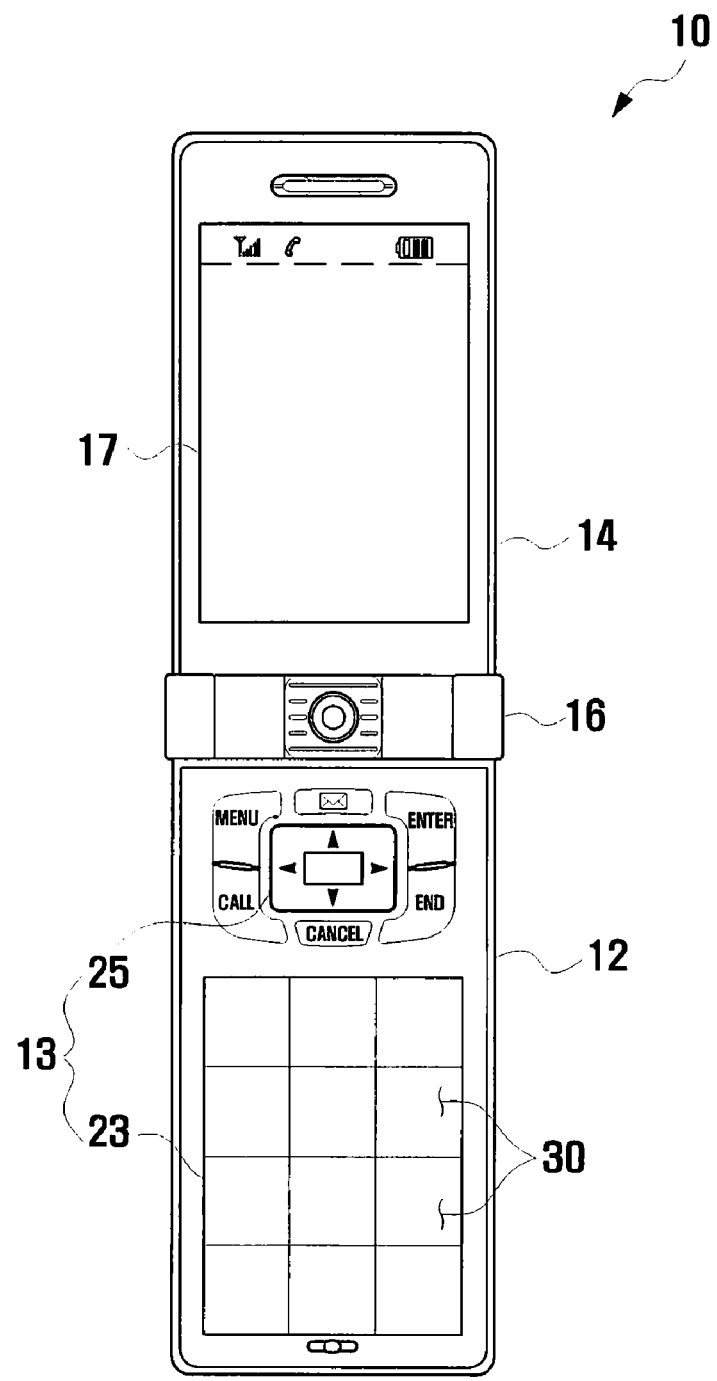
FIG. 2 is a top view illustrating the mobile communication terminal of FIG. 1.
Figure 3:
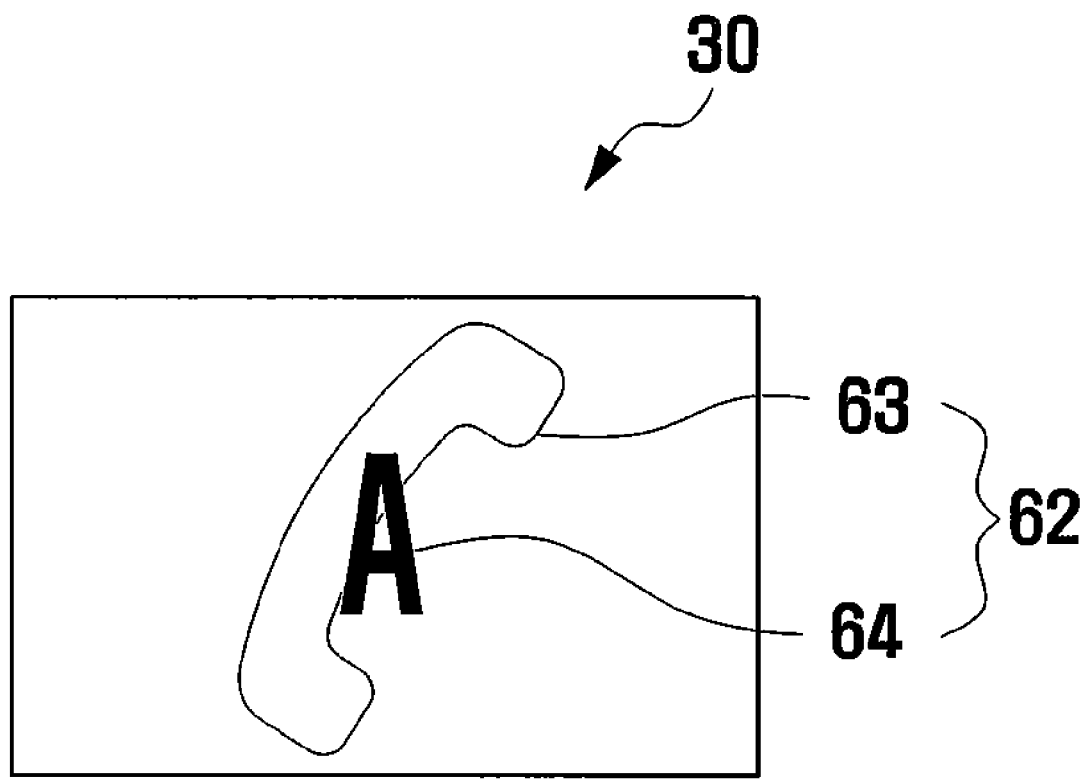
FIG. 3 illustrates an embodiment of an event icon displayed on a key cell of the mobile communication terminal of FIG. 2.

Referring to FIGS. 1 to 3, the mobile communication terminal 10 is configured to include a controller 11, a key input unit 13, a storage unit 15, a display 17, a wireless communication unit 19, and a voice processing unit 21.

The controller 11 controls the entire operation of the mobile communication terminal 10, and in particular, controls events received by a mobile communication terminal 10 while a user is away, which is referred to as a missed event or missed events.

The key input unit 13 is configured to include a plurality of keys for operating the mobile communication terminal 10. The key input unit 13 generates key data according to a user's key selection and transmits it to the controller 11. In particular, the user's command created through the key input unit 13 executes the selection of missed events and corresponding functions for the missed events.

The storage unit 15 stores a program controlling operations of the mobile communication terminal 10 and data generated while the program is being executed. As well, the storage unit 15 stores an application for processing missed events and data generated while the application program is being executed.

The display 17 displays images corresponding to data stored in the storage unit 15 as well as a variety of function menus executed in the mobile communication terminal 10. As well, the display 17 displays images for processing the missed events. The display 17 may be implemented by a Liquid Crystal Display (LCD).

The wireless communication unit 19 performs modulation and frequency conversion for information outputted from the controller 11 and transmits wireless signals through an antenna ANT. As well, the wireless communication unit 19 separates received signals from wireless signals received through the antenna ANT and then performs frequency conversion and demodulation or the received signals to output the signals to the controller 11.

The voice processing unit 21 converts a voice input through a microphone MIC into a digital signal, and demodulates voice data received by the wireless communication unit 17 to output the data signals to a speaker SPK, according to the control of the controller 11.

As shown in FIG. 2, the mobile communication terminal 10 according to an embodiment of the present invention may be implemented as a folder type terminal. In such a case, the mobile communication terminal 10 is configured to include a body 12 with a key input unit 13, and a folder unit 14 pivotally connected to the body by a hinge 16.

The key input unit 13 is configured to include a touch key pad 23 divided into a plurality of key cells 30, and a navigation pad 25 located at a top portion of the touch key pad 23. The touch key pad 23 is implemented by a touch screen, and includes the key cells 30 formed as 3×4 or 4×5 grids. Each of the key cells 30 may be fabricated to display an alphanumeric symbol or an event icon 62, as shown in FIG. 3.

The event icon 62 may be configured to include an identifying icon 63 and caller information 64. The event icon 62 will be described in detail later.

Referring back to FIG. 1, the storage unit 15 includes an identification icon storage unit 27, which stores data necessary to display the event icon 62, and a caller or origination information storage unit 29. The identification icon storage unit 27 stores the identifying icon 63 for classifying kinds of missed events. The identifying icon 63 refers to icons that classify a missed call, a missed text message, and a missed voice message, in which the icons can be implemented by a still image, a moving image, or a text. The caller information storage unit 29 stores the caller information 64 that includes at least one or more of a caller's icon, avatar, image, name, and phone number.

The controller 11 includes an event processing unit 22, an icon extracting unit 24, an event displaying unit 26 and, a function executing unit 28. The event processing unit 22 enables the storage unit 15 to store missed events, received in a waiting state. If the user's mobile communication terminal 10 changes from its waiting state to an enabled state, the icon extracting unit 24 extracts event icons 62, associated with missed events received while the user is away, from the storage unit 15. The event displaying unit 26 displays the extracted event icons 62 on the key cells 30 of the key touch pad 23, respectively. When the event icons 62 are touched, the function executing unit 28 executes functions associated with the touched event icons 62 to display a function executing screen on the display 17. Here, when the mobile communication terminal 10 changes from its waiting state to an enabled state, the controller 11 displays a waiting screen on the display 17. The icon extracting unit 24 extracts the identifying icons 63, included in the event icon 62, and the caller information from the storage unit 15.

The event displaying unit 26 displays the event icons 62 on the key cells 30 in sequence according to the time that the missed events are received, and according to the kinds of received events. The event displaying unit 26 displays the event icon 62 together with the identifying icons 63.

If the event icon 62 includes the identifying icon 63 and the caller information 64, the event displaying unit 26 displays both the identifying icon 63 and the caller information 64. For example, the event displaying unit 26 combines the identifying icon 63 with the caller information 64 and displays the result on the key cell 30 in order, at a certain time interval. As well, the event displaying unit 26 displays the missed events in a list, which is based on the kinds of missed events and the number of received missed events, on the wait screen of the display 17.

The function executing unit 28 changes a wait screen to a function executing screen. The function executing unit 28 displays content of a missed event that is associated with the event icon 62 touched through a function executing screen. The function executing unit 28 can perform functions that correspond to event contents based on key inputs that a user inputs though the key input unit 13. Here, these functions include to answering, sending, deleting, blocking, and saving phone numbers, with respect to the event contents. As well, the function executing unit 28 deletes event icons displayed on the key cells 30 and displays alphanumeric symbols corresponding to the event contents thereon.

Method For Processing Missed Events

The following is a description of the method for processing missed events with reference to FIGS. 1 to 9.

Figure 4:
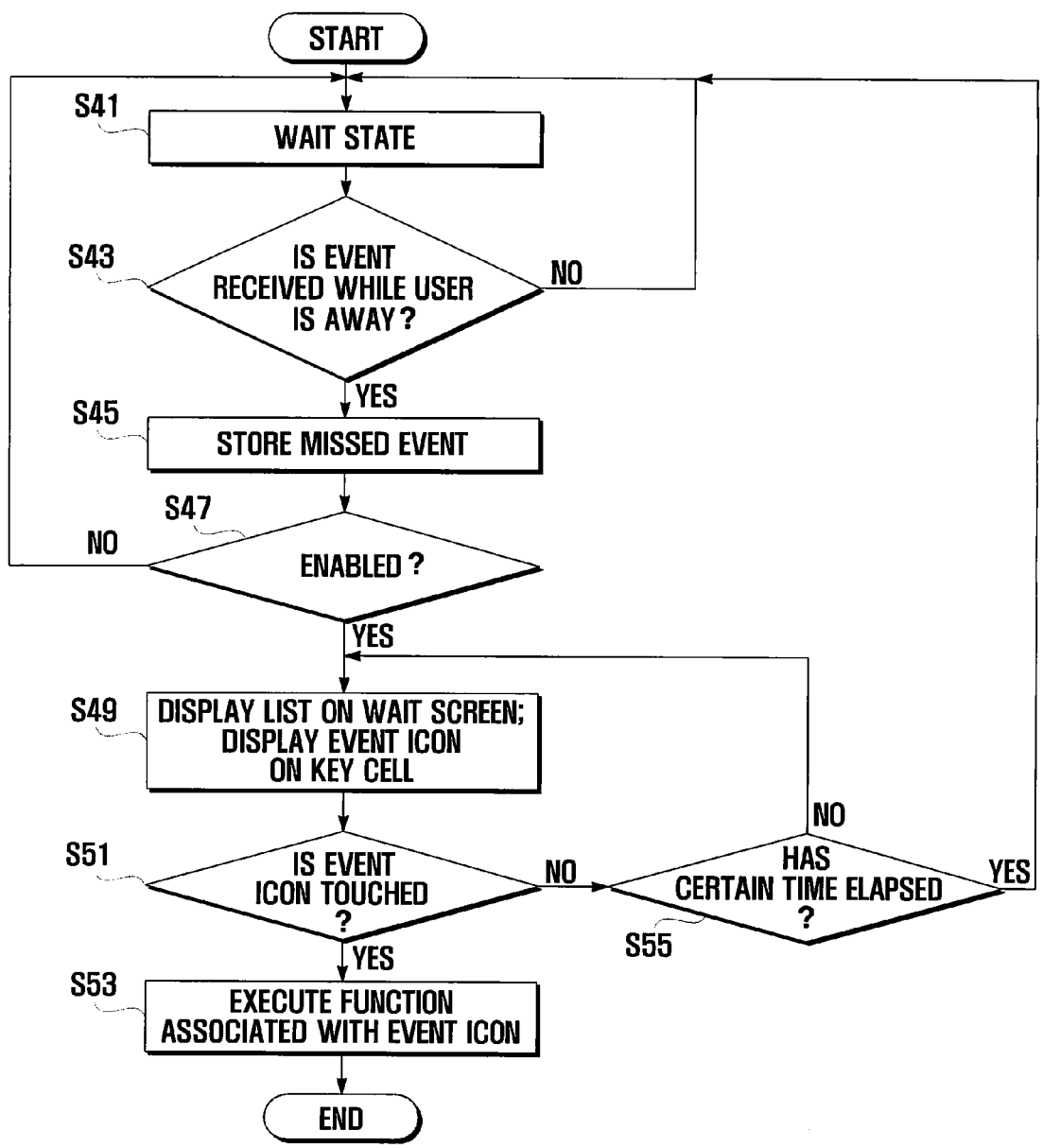
FIG. 4 is a flow chart describing a method for processing an event received during the absence of a mobile communication terminal according to an embodiment of the present invention.

As shown in FIG. 4, when the mobile communication terminal 10 is in a wait state in step S41, the controller 11 checks as to whether an event is received while a user is away in step S43. If there is an event received while the user is away, which is referred to as a missed event, the event processing unit 22 stores the missed event in the storage unit 15 in step S45. Otherwise, if there is no missed event, the controller 11 returns to step S41.

After storing the missed event, the controller 11 checks as to whether the mobile communication terminal 10 has changed its wait state to an enabled state in step S47. For example, the controller 11 checks as to whether a user opens the folder unit 14 on the body 12 of the mobile communication terminal 10.

If the result of step S47 is determined that the mobile communication terminal 10 has not changed to the enabled state, the controller 11 maintains the wait state of S41 and repeats steps S43 to S45.

On the contrary, if the check result of step S47 is determined that the mobile communication terminal 10 has changed to the enable state, a list is displayed on a wait screen and the event icons 62 are displayed on the key cells 30 in step S49. That is, the event display unit 26 displays the missed events on a list on the wait screen of the display 17. Also, the event displaying unit 26 displays the event icons 62 associated with the missed events on the key cells 30 of the touch pad 23, respectively. Here, before the event displaying unit 26 displays the event icons 62 on the key cells 30, the icon extracting unit 24 extracts the event icons 62 associated with the missed events from the storage unit 15.

The event displaying unit 26 can display the event icons 62 on the touch key pad 23 in sequence according to time or kinds of received events. Then, the user can read the state of the missed events through the event icons 62 at a glance.

Specifically, as shown in FIGS. 7A to 7C, a list 61 is displayed on a wait screen of the display 17, and event icons 62 are displayed on the key cells 30 of the touch pad 23, in sequence, according to time of received events. In particular, the event icons 62 are displayed on the key cells 30, according to the order of FIG. 7A to 7C, as time elapses. In the embodiment of the present invention, the wait screen 17a displays three calls, three text messages, and one voice message, which the user missed. Here, the event icons 62 may be displayed as in the following Table 1.

TABLE 1

| Key cell | Identifying icons | Caller information | | |
|---|---|---|---|---|
| | | Name | Phone number | Image |
| 1 | Receiver | A | 010-1111-1111 | — |
| 2 | Envelope | B | 010-2222-2222 | |
| 3 | Receiver | C | 010-3333-3333 | |
| 4 | Envelope | — | 010-4444-4444 | |
| 5 | Speaker | E | 010-5555-5555 | |
| 6 | Receiver | F | 010-6666-6666 | Face |
| 7 | Envelope | G | 010-7777-7777 | |

As described in Table 1, the receiver refers to an identifying icon corresponding to an "absence phone," the envelope refers to an identifying icon corresponding to a "text message," and the speaker refers to an identifying icon corresponding to a "voice message." The figures of the key cell 30 refer to the numbers corresponding to the key cells 30 when alphanumeric symbols are displayed thereon.

For example, key cell (no. 1) 31 displays an event icon 62 as two forms are alternatively changed at a certain period of time, in which one form is configured in such a way that an identifying icon (a receiver) and a name (A) are displayed together, as shown in FIG. 7A, and another form is configured in such a way that the identifying icon (the receiver) and a phone number (010-1111-1111) are displayed together, as shown in FIG. 7B.

Key cell (no. 4) 34 displays an event icon 62 through only a form where an identifying icon (a speaker) and a phone number (010-4444-4444) are displayed together, as shown in FIGS. 7A and 7C. This corresponds to a case where a mobile communication terminal 10 does not have a stored phone number in caller information.

Key cell (no. 6) 36 displays an event icon 62 as three forms in an order that is changed, at a certain period of time, in which one form is configured in such a way that an identifying icon (a receiver) and a name (F) are displayed together, as shown in FIG. 7A, another form is configured in such a way that the identifying icon (the receiver) and a phone number (010-6666-6666) are displayed together, as shown in FIG. 7B, and the other form is a caller's image are displayed together, as shown in FIG. 7C.

Key cells (nos. 2, 3, 5, and 7) 32, 33, 35, and 37 display event icons 62, respectively, like key cell (no. 1) 31 displays its event icon 62.

Meanwhile, although the embodiment of the present invention is implemented in such a way that seven event icons 62 are displayed on the key cells 31 to 37, it will be easily appreciated that the touch keypad 23 can be configured to include 10 event icons 62 in its key cells, thereby enabling all the key cells to display ten event icons 62. If the number of missed events is greater than 10, the event displaying unit 26 displays "Previous," and "Next" on both bottom key cells 38 and 39 of the touch key pad 23. Therefore, an eleventh event icon 62 and following icons thereof can be checked by using the "Previous" and "Next" key cells 38 and 39. Meanwhile, although the embodiment of the present invention is implemented by the "Previous" and "Next" key cells 38 and 39, it will be easily appreciated that the "Previous" and "Next" key cells can be modified to the following forms: "◁, ▷," "<, >," "◀, ▶," ">>, <<" etc.

Next, the controller 11 checks as to whether an event icon 62 displayed on the touch keypad 23 is touched in step S51. That is, the controller 11 determines as to whether a touch signal is output from the touch keypad 23 as the event icon 62 has been touched.

Figure 5:
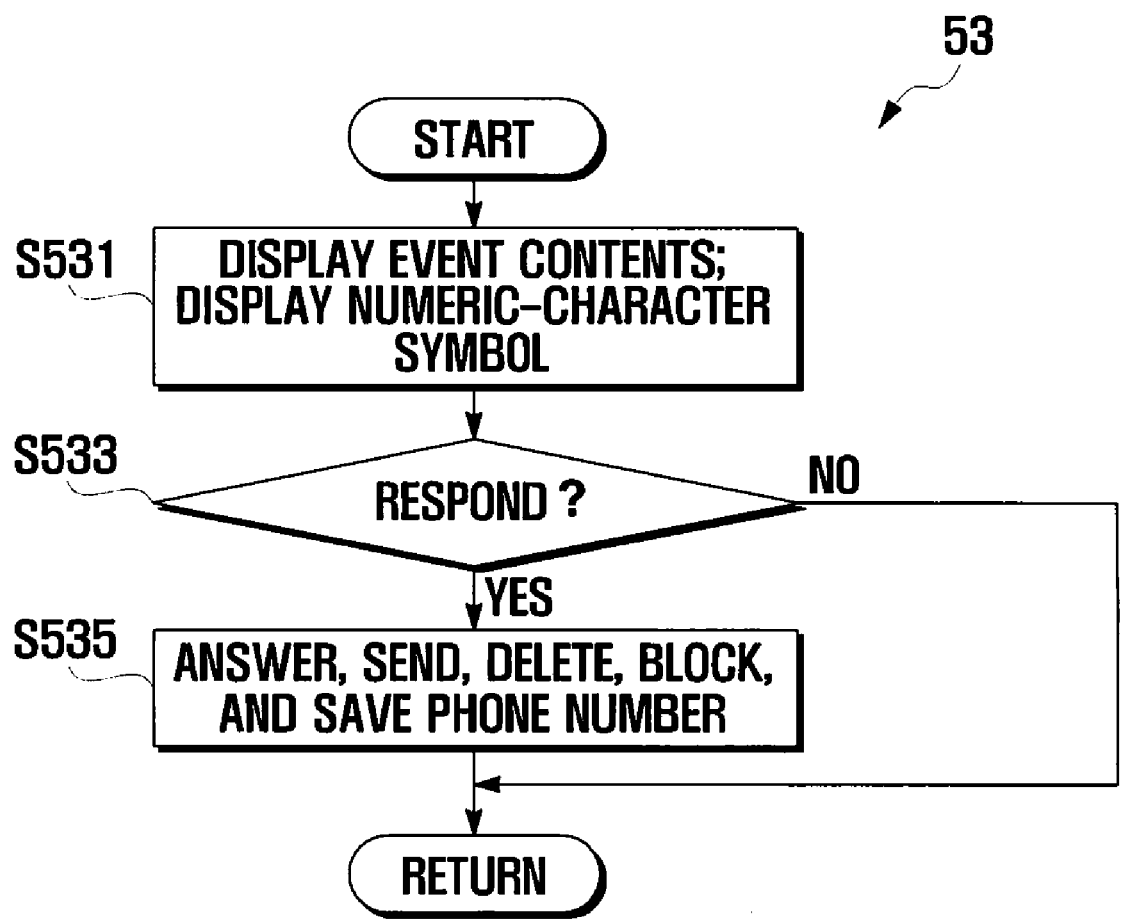
FIG. 5 is a flow chart describing a process of executing functions of FIG. 4.
Figure 6:
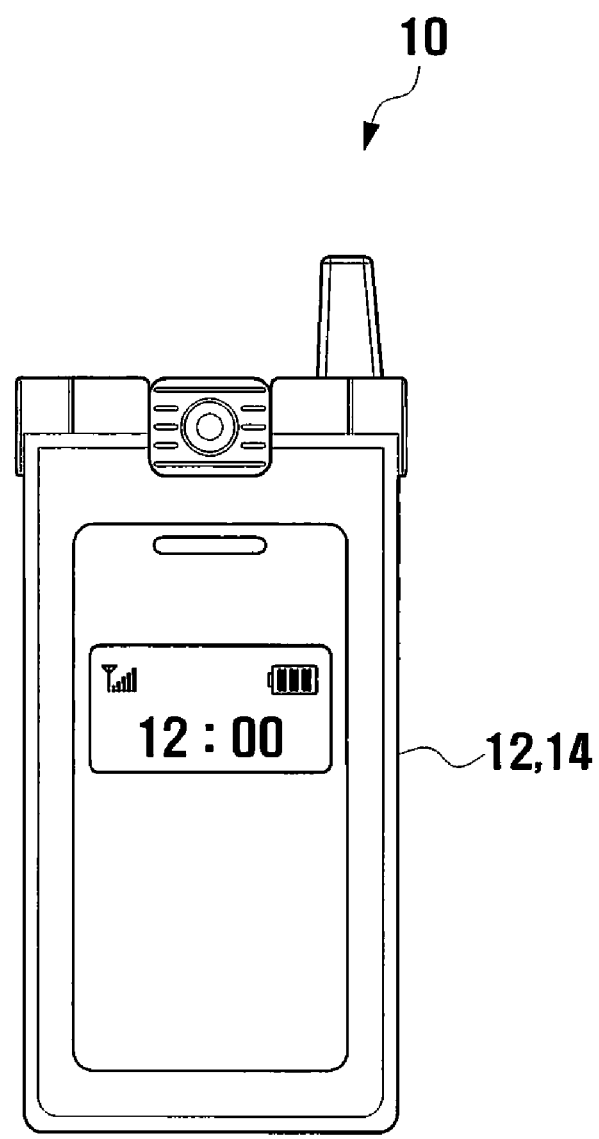
FIGS. 6 to 9 illustrate displays of a mobile communication terminal according to the method for processing events received during the absence as shown in FIG. 4.

If the event icon 62 is touched in step S51, the function executing unit 28 executes a function associated with the touched event icon 62 in step S53. Referring now to FIG. 5, the following is a detailed description of the function executing process of step S53.

As shown in FIG. 5, if a touch has occurred, the function executing unit 28 changes a wait screen to a function executing screen. The function executing screen displays the content of the event in step S531. The function executing unit 28 deletes an event icon 62 displayed on the key cell 30 and then displays alphanumeric symbols on the key cell 30 in step S531. As well, the function executing screen displays a menu allowing items corresponding to the content of the event to be selected.

After that, the function executing unit 28 determines whether a signal corresponding to the displayed event content is input in step S533. That is, the function executing unit 28 determines whether a menu button 25a of the navigation pad 25 is selected. If the menu button 25a is selected, the function executing unit 28 displays a corresponding item on the function executing screen in step S535. Here, the corresponding item includes whether the user wants to answer, send, delete, block, and save phone numbers. Therefore, the user can rapidly respond to event contents by selecting a corresponding item.

Figure 7:
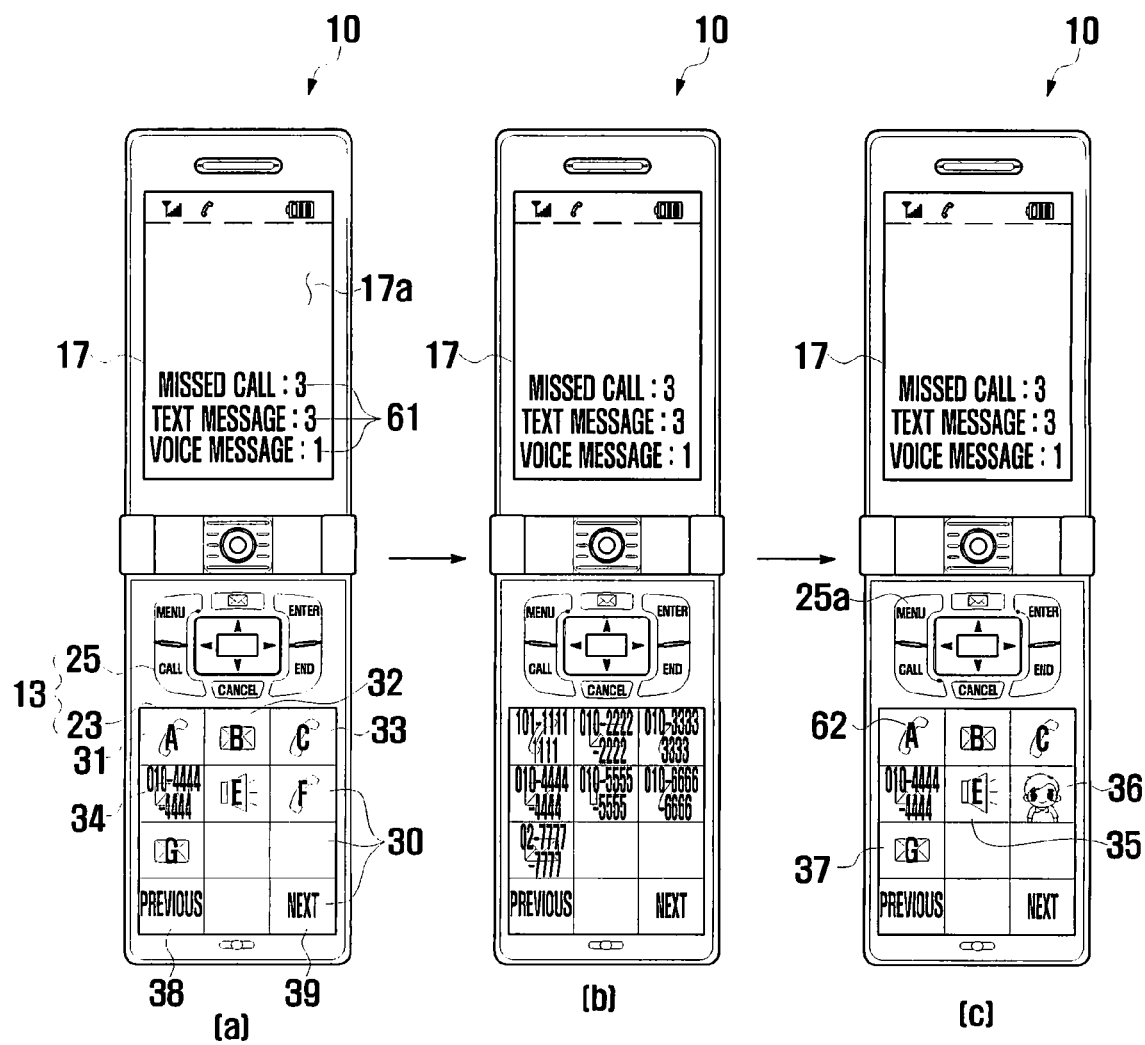
Figure 8:
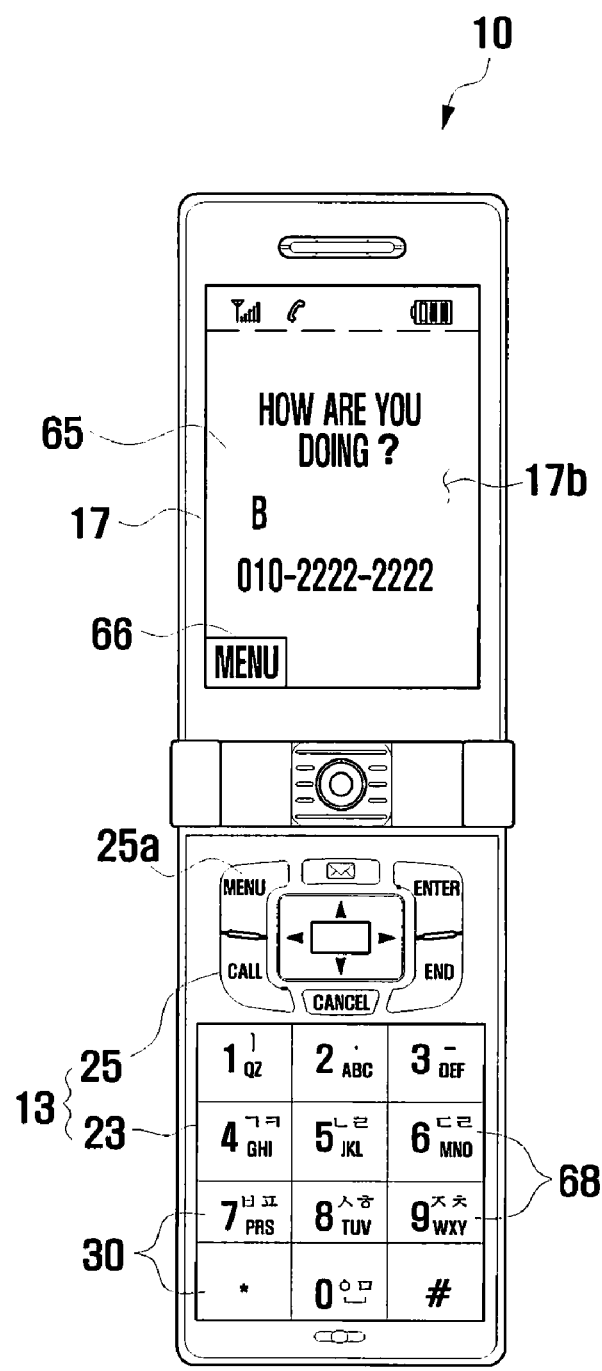

For example, if key cell (no. 2) 32, as shown in FIG. 7, is touched, the wait screen is changed into the function executing screen 17*b*, as shown in FIG. 8, and a text message 65 is displayed on the function executing screen 17*b*. As well, the key cell 30 of the touch keypad 23 displays an alphanumeric symbol 68. And, a menu icon 66 is displayed at the bottom left of the function executing screen 17*b*.

Figure 9:
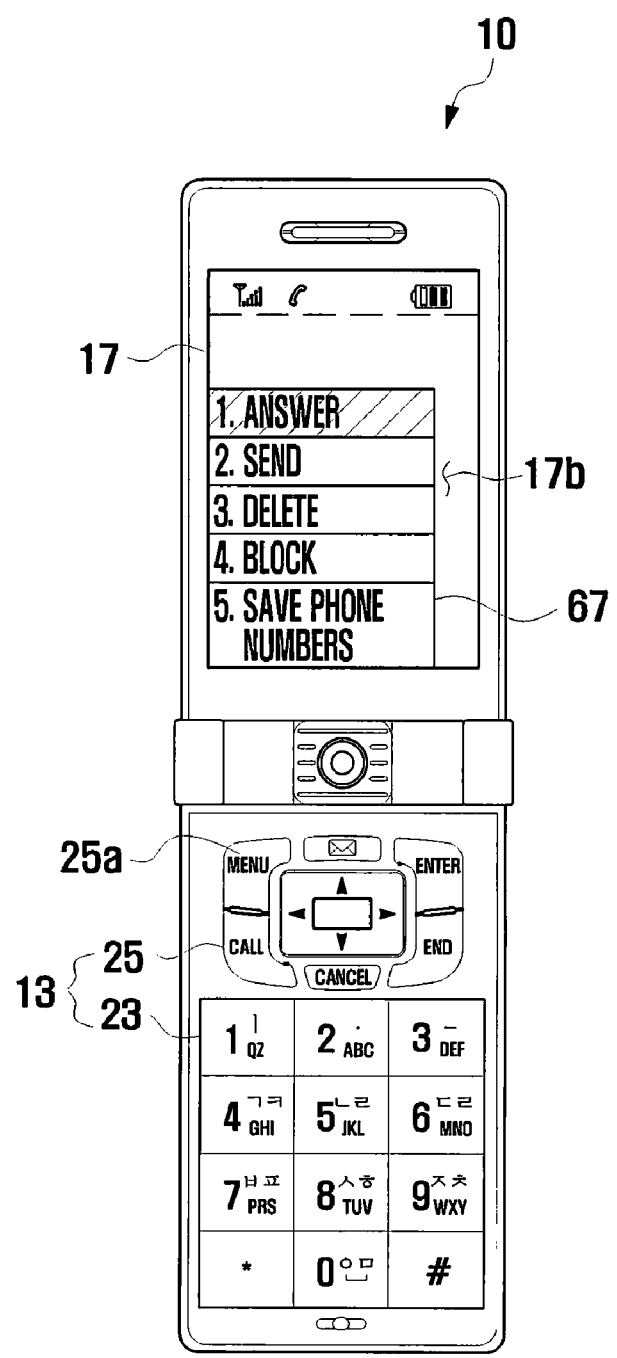

If the menu button 25*a* of the navigation pad 25 is selected, a corresponding item 67 is displayed as shown in FIG. 9. The corresponding item 67 displays, in order, answer, send, delete, block, and save phone numbers. The user inputs a key input to select the corresponding item 67, thereby responding to the event content displayed on the function executing screen 17*b*.

Meanwhile, if the event icon 62 is not touched in step S51 of FIG. 4, the controller 11 determines whether a certain time has elapsed in step S55. If the certain time has not elapsed, the controller 11 maintains its current state and returns to step S49. On the contrary, if the certain time has elapsed, the controller 11 changes the state of the mobile communication terminal 10 back to the wait state of step S41.

As described in the foregoing, since the missed events are displayed as event icons on the key cells of the touch keypad, together with caller information, the present invention can allow a user to read a state of the missed events at a glance.

As well, if an event icon is touched by a user, the function executing unit executes a function associated with the touched event icon to display the function executing screen. Therefore, the present invention can allow the user to read contents of the missed events that are associated with the event icon touched on the function executing screen, and to respond to the missed events rapidly.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A method for processing missed events of a mobile communication terminal that includes a display and a touch keypad having a plurality of key cells, the method comprising:
    storing events received in a wait state of the mobile communication terminal while a user of the mobile communication terminal is away, in which the received events are missed by the user;
    displaying event icons associated with the received missed events on the key cells of the touch keypad, respectively, when the wait state is changed to an enabled state; and
    when one of the event icons is touched, executing a function associated with the touched event icon.

2. The method of claim 1, wherein the missed events include a call, a text message, and a voice message.

3. The method of claim 2, wherein displaying event icons on the key cells comprises:
    displaying the missed events together with the number of the missed events according to the kinds of missed events, on a wait screen of the display.

4. The method of claim 3, wherein displaying event icons on the key cells comprises:
    displaying the missed events in sequence according to time or kinds of received events, on the key cells.

5. The method of claim 3, wherein executing a function changes the wait screen to a function executing screen associated with the event icon when the event icon is touched.

6. The method of claim 5, wherein executing a function displays contents of the missed event associated with the touched event icon on the function executing screen.

7. The method of claim 6, wherein executing a function is one of an answer function, send function, delete function, block function, and save phone number function, with respect to the event content.

8. The method of claim 2, wherein the event icon comprises identifying icons that classify kinds of missed events.

9. The method of claim 2, wherein the event icon comprises caller information.

10. The method of claim 9, wherein the caller information comprises at least one of a caller's icon, avatar, image, name, and phone number.

11. The method of claim 10, wherein displaying event icons on the key cells comprises:
    displaying an identifying icon of the event icon and the caller information.

12. The method of claim 1, wherein executing a function deletes the event icons displayed on the key cells and displays alphanumeric symbols on the key cells.

13. A mobile communication terminal comprising:
    a display for displaying a wait screen and a function executing screen;
    a touch keypad having a plurality of key cells;
    a storage unit for storing event icons associated with events intended to be received;
    an event processing unit for storing events in the storage unit, wherein the events are received in a wait state of the mobile communication terminal while a user of the mobile communication terminal is away, in which the received events are missed by the user;
    an icon extracting unit for extracting event icons associated with the missed events from the storage unit, when the wait state is changed to an enabled state;
    an event displaying unit for displaying the extracted event icons on the key cells of the touch keypad; and
    a function executing unit for executing a function associated with a touched event icon to display it on the function executing screen of the display.

14. The terminal of claim 13, wherein the event displaying unit displays the missed events in sequence according to time or kinds of received events, on the touch key pad.

15. The terminal of claim 14, wherein the event icon comprises identifying icons that classify kinds of missed events, and caller information.

16. The terminal of claim 15, wherein the event displaying unit displays an identifying icon of the event icon and caller information.

17. The terminal of claim 13, wherein the function executing unit deletes the event icons displayed on the key cells and displays alphanumeric symbols on the key cells.

18. The terminal of claim 13, wherein the event displaying unit displays the missed events together with the number of the missed events, according to the kinds of the missed events, on the wait screen of the display.

19. The terminal of claim 13, wherein the function executing unit displays contents of the missed event associated with the touched event icon on the function executing screen.

20. The terminal of claim 19, wherein the function executing unit performs an answer function, send function, delete function, block function, and save phone numbers function, with respect to the event content.

* * * * *